Patented Apr. 27, 1954

2,676,957

UNITED STATES PATENT OFFICE 2,676,957

DEAMINATED TRISAZO DYE

William H. Armento, Albany, N. Y., assignor to General Aniline & Film Corporation, New York, N. Y., a corporation of Delaware No Drawing. Application December 22, 1951, Serial No. 262,999

10 Claims. (Cl. 260—172)

This application is a continuation in part of application Serial Number 53,373 filed October 7, 1948. This application is now Patent No. 2,607,769 issued August 19, 1952.

This invention relates to a new class of azo dyes and particularly to trisazo dyes having a tetrazotized aromatic nucleus.

Azo dyes are derived by coupling diazo compounds with compounds designated as coupling components. These latter, in order to perform the coupling function, must contain activating groups which promote coupling. A discussion and disclosure of such groups, which may be termed "coupling promoting groups," may be found in vol. 2, page 227, of the Encyclopedia of Chemical Technology, 1948, Interscience Encyclopedia, Inc. Generally such compounds are phenols, naphthols, aromatic amines and compounds which possess enolizable ketone groups of an aliphatic character. In the case of the phenols, naphthols and aromatic amines the activating phenolic or amino group directs coupling or attachment of the azo group to an ortho or para position depending upon the position of the hydroxyl or amino group itself and the character and position of other substituent groups in the molecule.

The hydroxyl or amino activating groups in the phenols, naphthols and aromatic amines also affect the dye properties of the azo dye produced from the coupling reaction. The amino group favors the production of a bathochromic effect, that is a shift from the yellow toward blue or a deepening effect. The corresponding hydroxy or phenolic compounds are less bathochromic in effect. Hence, it may generally be said, that where deep colors are desired aromatic amines should be selected as the coupling components, and phenols or naphthols where lighter colors are desired. Additional substituents such as halogen, nitro, alkyl, aryl, alkoxy and additional amino and hydroxy groups having bathochromic effects are introduced in order to further modify the color.

The groups added for bathochromic purposes, however, may adversely affect other dyeing properties. Consequently, where an aromatic amine coupler may produce too deep a shade or may be undesirable for other reasons, a phenol or naphthol which has been modified by the introduction of bathochromic groups may lessen the substantivity of the resulting azo dye for certain materials or adversely affect its solubility properties.

It has now been discovered that a new class of azo dyes can be prepared by coupling one end of a tetrazotized aromatic compound to a first coupling component containing a non-primary-amino auxochrome group, coupling the other end to a second coupling component containing a diazotizable primary amino group and capable of coupling only once, diazotizing and coupling it with a third coupling component free of coupling promoting groups other than diazotizable primary amino groups, and then deaminating the compound.

The new class of azo dyes are trisazo dyes free of primary amino groups and may be represented by the formula

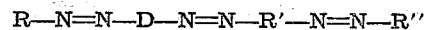

wherein R is a radical of a coupling component and contains a non-primary-amino auxochrome group; D is a radical of a tetrazotized aromatic compound; R' is a radical of a coupling component capable of coupling only once and R" is a member of the group consisting of radicals of the benzene and naphthalene series free of coupling promoting groups.

In general, any tetrazotized aromatic compound may be the nucleus of the dyestuffs of the invention. As the aforementioned first coupling component, any of the known coupling components containing non-primary-amino auxochrome groups may be employed, such as phenols, naphthols, ice-color coupling components and the like. The nature, function and identity of auxochrome groups for intensifying the color of dyestuffs is well known in the art whereby the proper selection of such operative first coupling component will be obvious to the skilled worker. (Ibid.: page 230, functions and examples of auxochromes.) Equally obvious will be the selection of the proper intermediates for use as the aforementioned second and third coupling components, which are essentially phenyl and naphthyl containing compounds. It will be understood that the tetrazotized nucleus and coupling components may contain substituent groups which do not interfere with the progress of the reaction for producing the desired results, as for example shade - modifying groups, water - solubilizing groups, and the like.

These deaminated dyes have excellent substantivity for leather, dyeing level and penetrating more deeply than the corresponding undeaminated dyes. They have excellent alkali solubilities. Some of these dyes are also excellent textile dyes, particularly on union materials such as cotton-wool, cotton-rayon, wool-rayon, mercerized cotton and rayon tubing. They have good acid resistant properties and good light and wash fastness.

In order to deaminate the intermediate dye containing the aromatic amine coupler, the amino group of said coupler is diazotized and the diazonium salt reduced by reaction with sodium formate or sodium acetate. The diazo compound of the dye readily reacts with the formate or acetate and the diazo group becomes reduced or replaced by hydrogen. In the case of the acetate reduction there may be side reactions resulting in some methylation, formation of biaryls and other products, but the formate results almost exclusively in the hydrogen replacement. Hence, although the acetate reduction works well in some instances, the formate process is generally preferred.

In carrying out the reduction process with formate or acetate an aqueous solution of the diazonium salt or the diazotization solution may be employed. Sufficient formate or acetate is added to neutralize all the free mineral acid in the solution and the acid formed during deamination. The reaction will take place at low temperature, but optimum results are obtained by raising the temperature to 60 to 70° C. and maintaining it at that level for one hour. Higher temperatures and shorter reaction times may be employed if desired.

The following examples will serve to further illustrate the invention, it being understood that the conditions, materials and quantities are not intended to be critical or to place any limitation on the scope of the invention. Parts are by weight unless otherwise indicated.

EXAMPLE 1

184 parts of benzidine are tetrazotized in the usual manner. To the neutralized tetrazo are added 145 parts of salicylic acid in slightly alkaline solution. 220 parts soda ash were then added and the mixture stirred at 5° to 10° C. until the monazo coupling is complete. A solution of 230 parts 1-aminonaphthalene-6-sulfonic acid is then added and the combination stirred overnight. The combination is diazotized with 620 parts hydrochloric acid and 75 parts sodium nitrite at 15°–20° C. for two hours. The diazo is run into a solution of 240 parts 1-amino-naphthalene-6-sulfonic acid containing 400 parts sodium acetate crystals and stirred over night at 10° to 15° C. In the morning, 525 parts hydrochloric acid are added and the combination rediazotized with 77 parts sodium nitrite at 20° C. for 2 hours. 150 parts sodium formate are added and the mixture is heated to 70° C. for one hour. The product is salted with 10% NaCl solution and isolated by filtration. When dried, a dark violet-brown powder is obtained which is soluble in alkali to a clear brown solution. The formula of the product is:

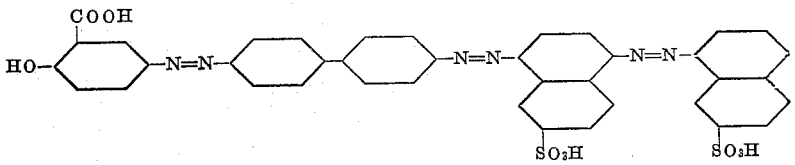

It corresponds to Dye No. 35 in the table below.

EXAMPLE 2

Example 1 is repeated, except that 1-aminonaphthalene-7-sulfonic acid is substituted for 1-aminonaphthalene-6-sulfonic acid in both instances. The formula of the product is:

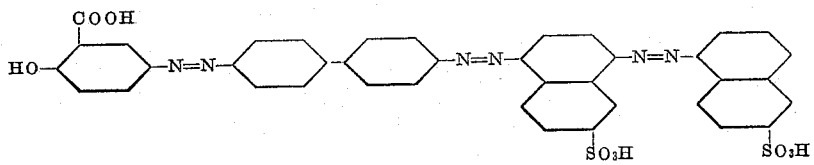

It corresponds to Dye No. 23 in the table below.

EXAMPLE 3

Example 1 is repeated, except that instead of using 1-aminonaphthalene-6-sulfonic acid, a mixed Cleves acid is employed. This is a mixed 1-amino-naphthalene-6(and 7)-sulfonic acid. The formula of the product is:

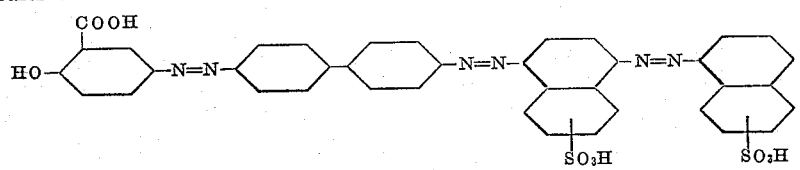

The product is a violet brown powder having good solubility, and dyes vegetable fibers and leather a full rich brown shade.

EXAMPLE 4

184 parts of benzidine are tetrazotized in the usual manner. To the neutralized tetrazo are added 150 parts of salicylic acid in a slightly alkaline solution. 220 parts of soda ash are then added and the mixture stirred at 3-8° C. until the monoazo coupling is complete. The solution is made slightly acid and 137 parts slightly acidified 5-methyl-o-anisidine is added and stirred well for about ½ hour. 150 parts sodium acetate are added as a 20% solution. Soda ash is then added to render the solution slightly alkaline. After overnight stirring the change is acidified and filtered.

The filtered product is sludged in acid solution and diazotized with 69 parts sodium nitrite solution at 19-23° C. The diazo is run into a slightly acidified solution of 223 parts 1-aminonaphthalene-6-sulfonic acid containing 300 parts sodium acetate crystals and stirred at about 10° C. overnight.

The charge is acidified, the temperature adjusted to about 19°–23° C. and 69 parts sodium nitrite solution added and maintained for about 2½ hours. 150 parts sodium formate are added

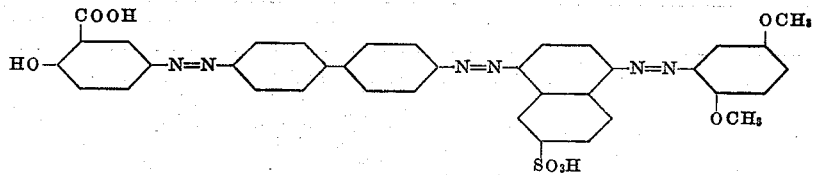

and the mixture heated to 80–85° C. for about ½ hour. The product is salted with 10% NaCl solution, filtered and dried. The formula of the product is:

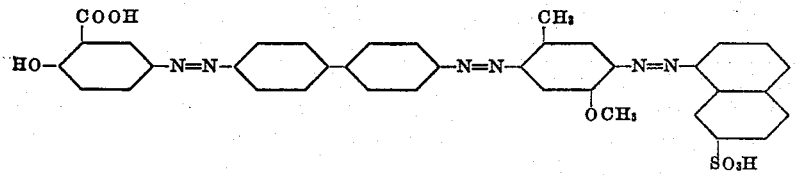

It corresponds to Dye No. 15 of the table below.

EXAMPLE 5

Example 4 is repeated, except that the 5-methyl-o-anisidine is replaced by 153 parts 2-amino-1,4-dimethoxybenzene. The formula of the product is:

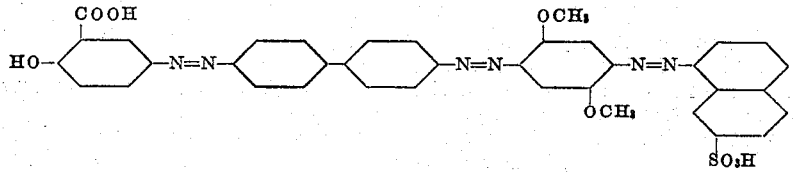

It corresponds to Dye No. 18 of the table below.

EXAMPLE 6

Example 1 is repeated, except that in the case of the final coupling, 153 parts 2-amino-1,4-dimethoxybenzene is employed. The formula of the product is:

It corresponds to Dye No. 25 of the table below.

EXAMPLE 7

Example 4 is repeated, except that after the last diazotization, there is substituted for 150 parts sodium formate, 300 parts sodium acetate.

The properties of the product are practically identical to those obtained in Example 4 except that the shades are slightly duller.

In the following tables there are listed a number of combinations of components which upon being reacted and deaminated in a manner similar to the procedure of the foregoing examples, have the indicated properties.

Table

| No. | R | D | R' | R'' | Cotton | Dyeings on wool | Leather |
|---|---|---|---|---|---|---|---|
| 1 | Salicylic acid | Dianisidine | 1-Aminonaphthalene-6-sulfonic acid. | 1-Aminonaphthalene-6-sulfonic acid. | Weak red brown. | Weak yellow brown. | Brown. |
| 2 | Phenylmethylpyrazolone. | do | do | do | Dull weak violet. | Weak red brown. | Red brown. |
| 3 | Resorcinol | do | do | do | Weak dull red violet. | Very weak red brown. | Do. |
| 4 | 1-Naphthol | do | do | do | Weak dull red gray. | Weak red brown. | Yellow brown. |
| 5 | 2-Naphthol-6-sulfonic acid. | do | do | do | Weak dull blue. | Very weak pink. | Violet. |
| 6 | Phenol | do | do | do | Dull dark brown. | Dark brown. | Dark brown. |
| 7 | Acetoacetanilide | do | do | do | Dull yellow brown. | Yellow brown. | Yellow brown. |
| 8 | 2-Naphthol-3,6-disulfonic acid. | do | do | do | Weak dull violet. | Very weak red brown. | Violet. |
| 9 | 2-hydroxy-3-naphthoic acid. | do | do | do | do | Weak dull gray. | Red gray. |
| 10 | 1-Naphthol-3,8-disulfonic acid. | do | do | do | Dull red violet. | Very weak red brown. | Red brown. |
| 11 | 2-Hydroxy-3-naphthanilide. | do | do | do | Weak dull violet. | Dull violet. | Violet. |
| 12 | Salicylic acid | Benzidine | m-Toluidine | do | Dull brown. | Dull brown. | Brown. |
| 13 | do | do | o-Anisidine | do | Yellow brown. | Yellow brown. | Do. |
| 14 | do | do | 2-Amino-5-naphthol-7-sulfonic acid. | do | Dull blue. | Weak dull red blue. | Red blue. |
| 15 | do | do | 5-Methyl-o-anisidine. | 1-Amino-naphthalene-6-sulfonic acid. | Strong bright brown. | Strong bright brown. | Brown. |
| 16 | do | do | o-Toluidine | do | Strong brown. | Bright red brown. | Yellow brown. |
| 17 | do | do | 1-Amino-naphthalene. | do | Strong red brown. | do | Do. |
| 18 | do | do | 2-Amino-1,4-dimethoxy-benzene. | do | do | do | Red brown. |
| 19 | 2-Hydroxy-3-naphthoic acid. | do | 1-Aminonaphthalene-6-sulfonic acid. | do | Dull violet. | Dull violet. | Violet. |
| 20 | Acetoacetanilide | do | do | do | Very weak dull brown. | Very weak dull brown. | Very light brown. |
| 21 | 2-Hydroxy-3-naphthanilide. | do | do | do | Weak dull blue. | Dull blue. | Violet. |

Table—Continued

| No. | R | D | R' | R'' | Cotton | Dyeings on wool | Leather |
|---|---|---|---|---|---|---|---|
| 22 | Salicylic acid | Benzidine | 1-Aminonaphtha-lene-6-sulfonic acid. | 1-Aminonaphtha-lene-7-sulfonic acid. | Brown | Brown | Brown. |
| 23 | do | do | 1-Aminonaphtha-lene-7-sulfonic acid. | do | Yellow brown | Yellow brown | Yellow brown. |
| 24 | do | do | 1-Amino-naphtha-lene-6-sulfonic acid. | m-Toluidine | Dull red brown | Red brown | Brown. |
| 25 | do | do | do | 2-Amino-1,4-di-methoxybenzene. | Dark brown | do | Dark brown. |
| 26 | do | do | do | m-Phenylene-di-amine. | Strong brown | Weak dull brown. | Do. |
| 27 | do | Benzidine-2,2'-disulfonic acid. | do | 1-Amino-naphtha-lene-6-sulfonic acid. | Weak brown stain. | Weak brown stain. | Weak brown. |
| 28 | do | Toluidine | do | do | Dull brown | Dull red brown | Yellow brown. |
| 29 | do | 3,3'Dichloroben-zidine. | do | do | Dull yellow brown. | Yellow brown | Do. |
| 30 | do | 4,4'-Diaminobenz-anilide. | do | do | Yellow brown | do | Do. |
| 31 | do | 4,4'-Diamino-2,2'-stilbene-disul-fonic acid. | do | do | Very weak brown. | Does not dye | Dull brown. |
| 32 | do | 4,4'-Di-amino-azoxy-benzene. | do | do | Very weak red brown. | Orange brown | Orange brown. |
| 33 | do | 3,3'-Diamino-di-phenylurea. | do | do | Very weak brown. | Weak brown | Brown. |
| 34 | do | Benzidine | 1-Amino-naphtha-lene-5-sulfonic acid. | 1-Amino-naphtha-lene-5-sulfonic acid. | Brown | Brown | Do. |
| 35 | do | do | 1-Amino-naphtha-lene-6-sulfonic acid. | 1-Amino-naphtha-lene-6-sulfonic acid. | do | do | Do. |

Various modifications and variations of this invention will be obvious to a worker skilled in the art and it is understood that such modifications and variations are to be included within the purview of this application and the spirit and scope of the appended claims.

I claim:

1. Trisazo dyes free of primary amino groups and characterized by the structural formula:

R—N=N—D—N=N—R'—N=N—R'' wherein R is a radical of a coupling component and contains a non-primary-amino auxochrome group; D is a radical derived from a tetrazotized aromatic compound which contains two phenylene nuclei; R' is a radical derived from a coupling component capable of coupling only once and R'' is a member of the group consisting of radicals of the benzene and naphthalene series free of coupling promoting groups.

2. The dyestuff of the formula:

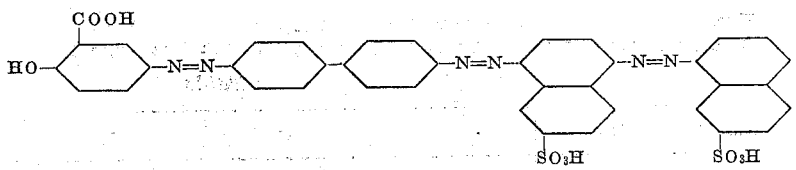

3. The dyestuff of the formula:

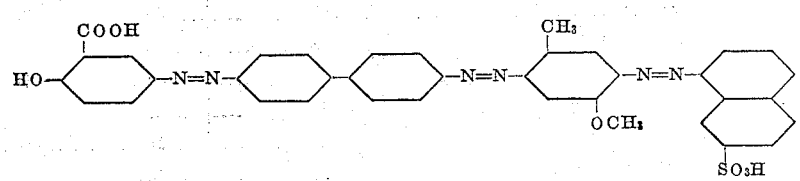

4. The dyestuff of the formula:

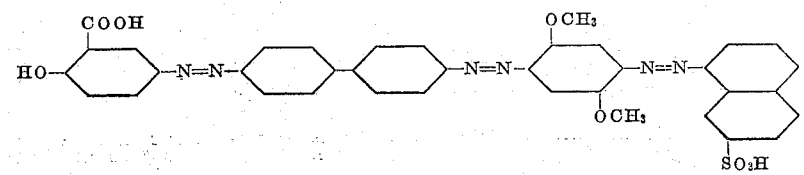

5. The dyestuff of the formula:

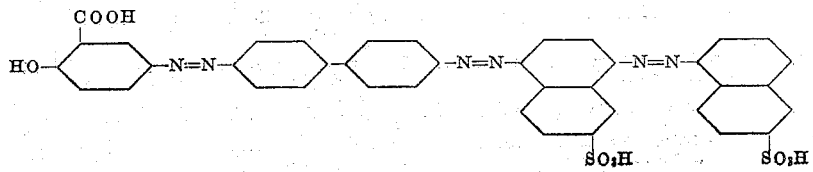

6. The dyestuff of the formula:

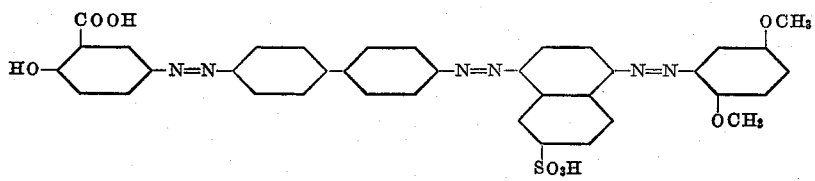

7. A process comprising coupling one end of a tetrazotized aromatic compound which contains two phenylene nuclei to a first coupling component containing a non-primary-amino auxochrome group, coupling the other end to a second coupling component containing a diazotizable primary-amino group and capable of coupling only once, diazotizing and coupling it with a third coupling component free of coupling promoting groups other than diazotizable primary-amino groups, and then deaminating the compound.

8. A process comprising coupling one end of a tetrazotized aromatic compound which contains two phenylene nuclei to a first coupling component containing a non-primary-amino auxochrome group, coupling the other end to a second coupling component containing a diazotizable primary-amino group and capable of coupling only once, diazotizing and coupling it with a third coupling component free of coupling promoting groups other than diazotizable primary-amino groups, and then deaminating the compound by diazotizing and reacting it with a member of a group consisting of alkali metal formate and alkali metal acetate.

9. A process comprising coupling one end of a tetrazotized aromatic compound which contains two phenylene nuclei to a first coupling component containing a non-primary-amino auxochrome group, coupling the other end to a second coupling component containing a diazotizable primary-amino group and capable of coupling only once, diazotizing and coupling it with a third coupling component free of coupling promoting groups other than diazotizable primary-amino groups, and then deaminating the compound by diazotizing and reacting it with sodium formate.

10. A process comprising coupling one end of a tetrazotized aromatic compound which contains two phenylene nuclei to a first coupling component containing a non-primary-amino auxochrome group, coupling the other end to a second coupling component containing a diazotizable primary-amino group and capable of coupling only once, diazotizing and coupling it with a third coupling component free of coupling promoting groups other than diazotizable primary-amino groups, and then deaminating the compound by diazotizing and reacting it with sodium acetate.

References Cited in the file of this patent
UNITED STATES PATENTS

| Number | Name | Date |
| --- | --- | --- |
| 399,581 | Strasburger | Mar. 12, 1889 |
| 515,381 | Ulrich et al. | Feb. 27, 1894 |
| 515,897 | Brack | Mar. 6, 1894 |
| 516,381 | Rudolph | Mar. 13, 1894 |
| 603,646 | Krekeler et al. | May 10, 1898 |
| 2,155,001 | Schmid | Apr. 18, 1939 |
| 2,174,998 | Rossander | Oct. 3, 1939 |